Jan. 29, 1957 A. M. KIMBRO ET AL 2,779,602
WHEEL MOUNTINGS FOR TRAILERS AND THE LIKE
Filed Sept. 27, 1954 3 Sheets-Sheet 3

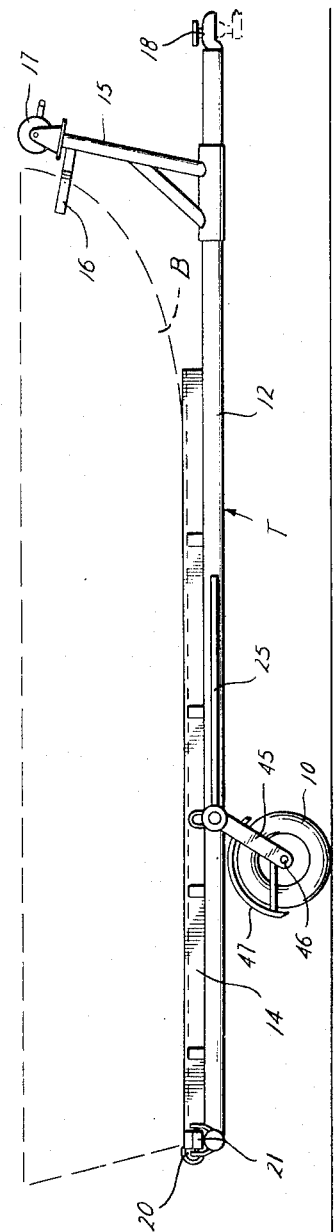
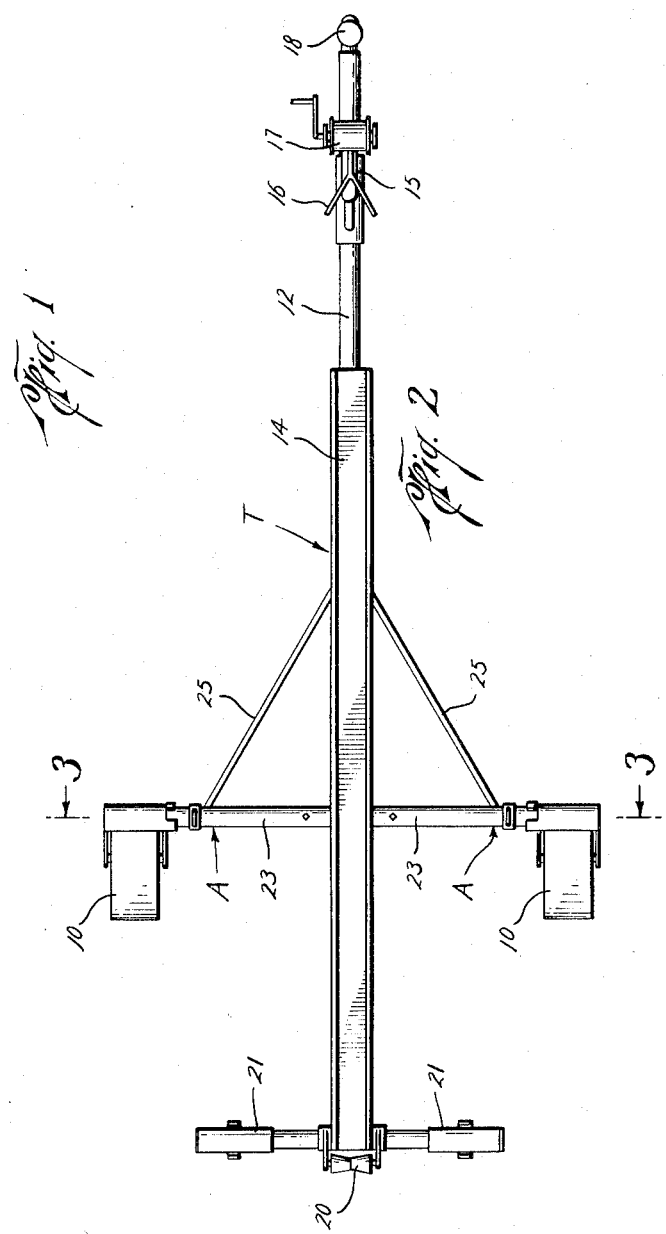

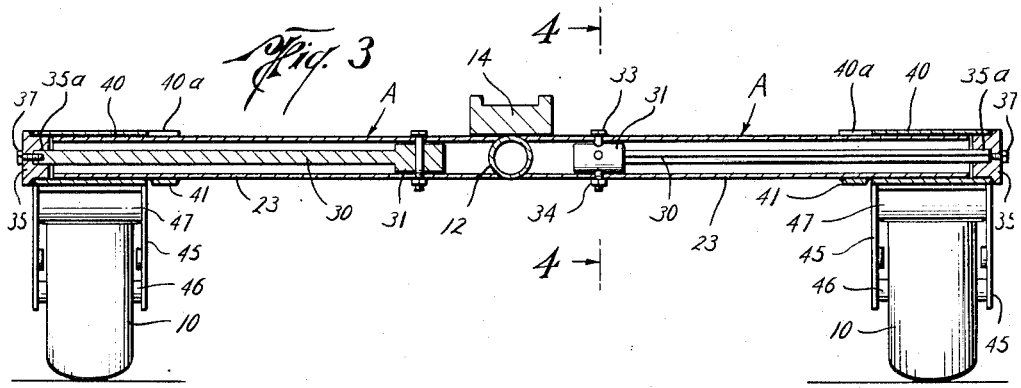
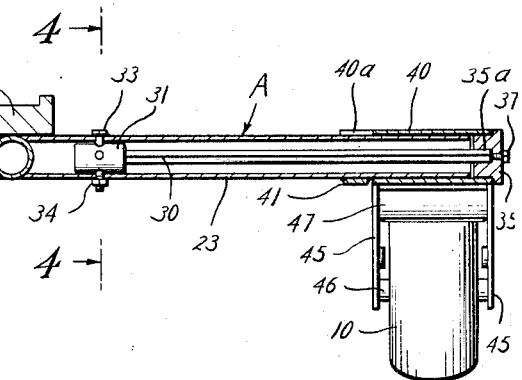
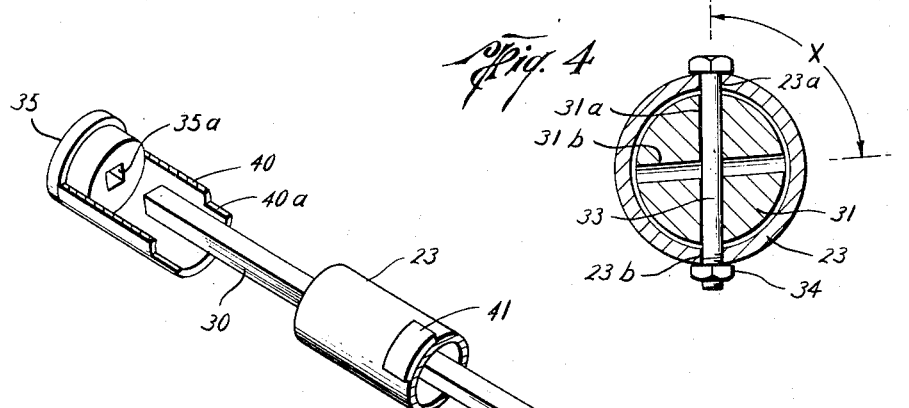
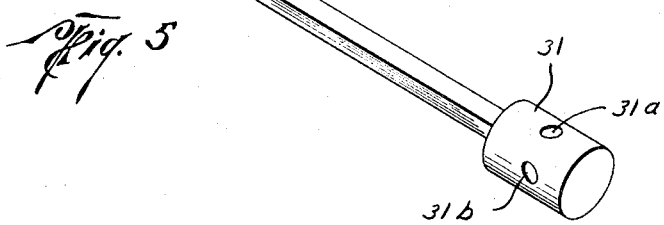
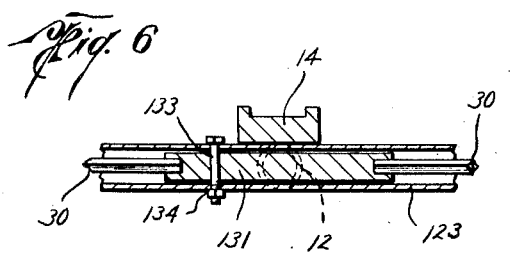

Lee J. Tunkis
Albert M. Kimbro
INVENTORS

BY

ATTORNEYS

United States Patent Office 2,779,602
Patented Jan. 29, 1957

2,779,602

WHEEL MOUNTINGS FOR TRAILERS AND THE LIKE

Albert M. Kimbro and Lee J. Tunkis, Houston, Tex., assignors to South Texas Truck Equipment Co., Inc., Houston, Tex., a corporation of Texas Application September 27, 1954, Serial No. 458,580

1 Claim. (Cl. 280—43)

This invention relates to new and useful improvements in wheel mountings for trailers and the like.

An object of this invention is to provide a new and simplified wheel mounting for trailers and the like, wherein the wheel is so mounted that it is adapted to yield resiliently upon a contact of the wheel with bumps or other irregularities in the road surface over which the wheel travels, such construction eliminating the usual coil spring shock absorbers or the conventional leaf spring support for the wheels.

An important object of this invention is to provide a new and improved wheel mounting for trailers and the like wherein a wheel is attached to a torque bar in such a manner that road shock occasioned by the wheel contacting bumps or other irregularities in the road is absorbed by imparting upward movement of the wheel to the bar to apply a torque thereto which resists such upward movement to return the wheel to its normal running position.

Another object of this invention is to provide a new and improved wheel mounting for trailers and the like, wherein said mounting provides a resilient support for a wheel without using the conventional coil spring or leaf spring constructions.

A further object of this invention is to provide a new and improved wheel mounting which includes a torque bar which is held against movement at its inner end and which is connected to a pivotally mounted wheel at its outer end, whereby vertical movements of the wheel are transmitted to the bar, the upward wheel movements being resisted by the inherent elasticity of the bar, and with the extent of movement of the wheel being limited so as to prevent the torque bar from being twisted past its elastic limit.

Another object of this invention is to provide a new and improved wheel mounting for trailers and the like, wherein each wheel of the trailer is mounted on a torque bar, and wherein said torque bar is releasable by manipulation from the forward end of the trailer, whereby the lowering of the trailer into the water for the release of a boat or similar object thereon is facilitated.

Still another object of this invention is to provide a new and improved wheel mounting wherein a wheel is suspended at the end of a torque bar, with the other end of the torque bar being detachably connected to a rigid frame, said detachable connection permitting adjustment for regulating the resiliency or cushioning effect of the wheel mounting.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is an elevation illustrating the wheel mounting of this invention as utilized on a boat trailer.

Figure 2 is a plan view of the trailer illustrated in Figure 1.

Figure 3 is a view, partly in elevation and partly in section, taken on line 3—3 of Figure 2, and illustrating the details of the wheel mounting of this invention.

Figure 4 is a view, partly in elevation and partly in section, illustrating one type of adjustable means for varying the cushioning effect of the wheel mounting of this invention.

Figure 5 is an isometric view illustrating the major parts of the wheel mounting of this invention.

Figure 6 is a sectional view illustrating a portion of the wheel mounting of this invention wherein a modification of the attachment to the frame is illustrated.

Figure 7:
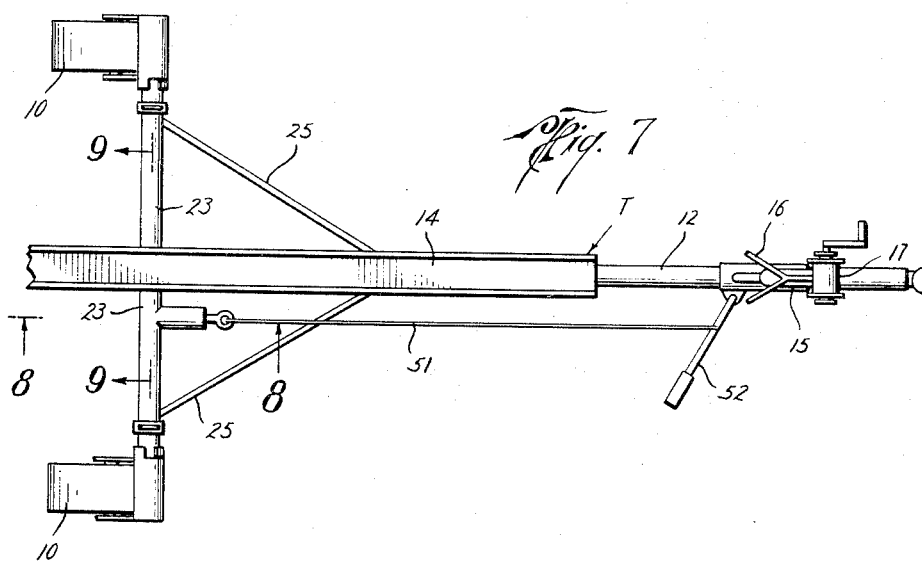
Figure 7 is a plan view of a boat trailer having the wheel mounting of this invention in combination therewith and particularly illustrating the means for releasing the wheel mounting from its active position.

In the drawings, the letter T designates generally a boat trailer which is adapted to receive and hold a boat B for transportation to and from a body of water. The trailer frame T has a wheel mounting A at each side thereof, with one of the wheel mountings being provided for each wheel 10. Each wheel 10 is so mounted that the usual coil spring shock absorbers and the conventional leaf springs for absorbing road shock are eliminated, and instead a very simplified construction is provided which resiliently supports each wheel 10 so that very little of the road shock occasioned by bumps or other irregularities in the road is transmitted to the boat trailer T or such other type of trailer or other device as the wheel mounting A is used with.

Although the wheel mounting A of this invention may be used with other types of trailers and other equipment than the boat trailer illustrated in the drawings, for clarity the invention is described herein in connection with the boat trailer T which includes a longitudinal frame member 12 which extends for the full length of the trailer and which has welded or otherwise rigidly secured thereon a channel member 14 into which the central lower portion of the boat B is adapted to be positioned. A forward support member 15 is mounted on the longitudinal frame 12 and it includes an angular bracket 16 which receives the forward pointed end or bow of the boat. A small winch 17 is suitably mounted on the forward support 15 for pulling the boat onto the trailer when the boat is being loaded thereon from the water or from some other location. At the extreme forward end of the longitudinal frame member 12, there is located a connecting bracket 18 of conventional construction for connecting the trailer T to a truck or car for the hauling of the boat B to and from the body of water in which the boat is to be used. The rear of the trailer is provided with a roller 20 which facilitates the movement of the boat to and from the trailer. Lateral frame extensions 21 contact the bottom of the boat at its rear portion to balance same on the trailer and keep the boat from tipping during the transportation thereof.

The boat trailer frame includes laterally extending wheel support frames 23 which extend from the central longitudinal frame member 12 and which are rigidly connected thereto by welding or other securing means. Braces 25 extend diagonally from the lateral frame members 23 to the longitudinal frame member 12 to further strengthen the frame construction. As will be explained in detail hereinafter, each wheel 10 is connected to a lateral wheel support frame member 23 by means of the particular wheel mounting A of this invention, and although the wheels 10 are thus indirectly connected to the common central frame member 12, each wheel 10 is adapted to move vertically independently of the other wheel, as will be more evident hereinafter.

Since each wheel mounting A (see particularly Figures 3–5) is identical, only one will be described in detail. Each wheel mounting A includes a torque bar or rod 30 which is formed of steel or other material having a very high elastic limit whereby large torque forces can be applied thereto without permanently twisting such bar. The bar 30 has an enlarged head 31 at its inner end which is secured to the lateral wheel support frame 23 of the boat trailer by means of a bolt 33 which extends through an opening 31a in the head 31 and also through openings 23a and 23b in the frame 23 (Figure 4). In the usual case, the lower end of the bolt 33 has a nut 34 threaded thereon. It will also be understood that other types of securing means can be utilized for maintaining the head 31 and the bar 30 secured to the frame at the inner end of the bar 30. The torque bar 30 is square in cross section and has its outer end fitted within a square opening 35a (Figure 5) in a cylindrical plug 35. The outer end of the torque bar 30 is prevented from shifting out of the opening 35a by a screw 37 (Figure 3) which extends into the end of the bar 30 and retains same against movement.

The plug 35 is welded or otherwise secured to a pivot sleeve 40 which surrounds the outer end of the frame member 23 and which is pivotable relative thereto. The inner end of the sleeve 40 is provided with an arcuate notch 40a which confines a stop lug 41 on the frame member 23 for limiting the pivotal or rotational movement of the sleeve 40 with respect to the frame member 23, as will be more evident hereinafter.

Axle support arms 45 are welded to the sleeve 40 for supporting the wheel axle 46 upon which the wheel 10 is mounted. A guard or fender 47 is preferably provided also, and is suitably attached to the members 45. In the normal running position (Figures 1 and 2), the axle support members 45 are inclined rearwardly so that as each wheel 10 moves upwardly, the axle support members 45 act as a lever or levers for transmitting such upward movement of the wheel 10 to the torque bar 30, whereby the torque bar 30 acts by reason of its inherent elasticity to return the wheel 10 to the normal running position (Figures 1 and 2). Thus, the torque bar 30 provides resiliency or a cushioning effect which absorbs road shock occasioned by the wheels 10 encountering bumps or other irregularities in the road surface over which they travel during the transportation of the boat to and from the places at which such boat is used.

From the foregoing, it will be evident that the resiliency or cushioning effect provided by the wheel mounting A takes the place of the usual coil spring or leaf spring mountings for wheels and that the cushioning effect can be increased or decreased by the length of the axle support arms 45 from the axle 46 to the torque bar 30. For example, if the wheels 10 are lowered from the position shown in Figure 1 so that the arms 45 extend at a greater angle with respect to the vertical so that they are more nearly horizontal than that shown in Figure 1, then the arms 45 actually are greater in effective lever length and for the same upward force on the wheel 10 the torque bar will be caused to yield more readily so that the effect is more resilience or a "softer" ride. To facilitate the adjustment of the wheel 10 to different positions, one type of adjustment is illustrated in Figure 4 wherein a second opening 31b is provided in the head 31. Such opening 31b is positioned at an angle X which is 85 degrees from the opening 31a. When the bar 30 is released at its outer end from the plug 25 and at its inner end by removing the bolt 33, the rod 30 can be turned and the bolt 33 inserted into the opening 31b. The outer end of the rod 30 is then inserted into the plug 35. Such change results in a net rotation of the rod for 5 degrees which is the difference between the 85 degree angle and the 90 degree rotation which is made at the outer end of the rod 30 so that the axle support arms 45 are actually rotated rearwardly 5 degrees. Thus, the arms 45 are more nearly horizontal than when the bolt 33 is in the opening 31a and a greater cushioning effect is obtained. The angle X can of course be varied so as to change the cushioning effect of the wheel mounting A. In fact, other openings 31a and 31b could be provided in the head 31 so that a plurality of adjustments could be available with a particular head and torque bar.

Regardless of the angle at which the axle support members 45 are located in the normal running position, the functioning of the wheel mounting A will be the same. Thus, in use the wheels 10 will be urged upwardly by bumps or other irregularities in the road which the wheels are traveling and such upward movement is resisted by the torque bar 30 since such upward movement is transmitted from the wheel 10 to the torque bar 30 through the pivotal sleeve 40 and the plug 35. As the wheel 10 moves upwardly the sleeve 40 pivots relative to the frame member 23 and the torque bar 30 is twisted due to the fact that the inner end thereof at the head 31 is secured to the frame 23 whereas the outer end is free to pivot with the wheel 10. Since the torque bar 30 is formed of steel or other material which has a certain amount of elasticity and which inherently resists turning or twisting, the torque bar 30 tends to return the wheel 10 to its normal running position. Thus, the tendency of the wheel 10 to move upwardly when a bump is encountered is resisted and the wheel is also returned to the normal running position after the wheel has passed over the bump. To prevent the torque bar 30 from being twisted beyond the normal elastic limit of the material from which it is made, the stop lug 41 on the frame member 23 limits the extent of rotation or pivoting of the wheel 10 with the sleeve 40, since the ends of the notch 40a on the sleeve 40 contact the lug 41 prior to the rod 30 reaching its elastic limit. Therefore, it is assured that the wheel 10 returns to its normal running position without permanently distorting or twisting the torque rod 30.

In Figure 6, a modification is illustrated wherein the two wheel mountings for the particular trailer T shown in the drawings are interconnected by a common head 131 which is welded or otherwise secured to the respective rods of the wheel mounting A. In this construction, the longitudinal frame member 12 of the trailer T is welded to a continuous lateral wheel support frame member 123 so as to accommodate the common head member 131. A bolt 133 secures the head 131 in position in a manner identically with that described above in connection with the bolt 33. A nut 134 is also utilized in the same manner as the nut 34. Both wheels can be adjusted for varying the cushioning effect of the wheel mounting A with suitably arranged openings in the same manner as illustrated in connection with the head 31 in Figure 4. With such a construction as illustrated in Figure 6, the wheels 10 will each still pivot or respond to bumps independently of each other and each torque bar will function in the same manner as the torque bar 30 described above in connection with Figures 3 and 5.

Figure 8:
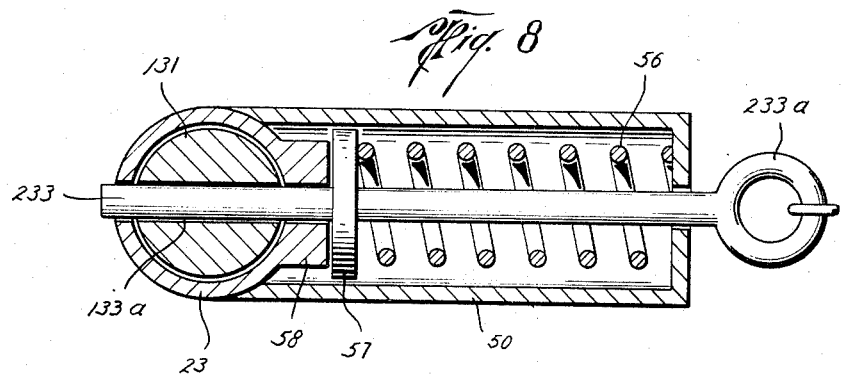
Figure 8 is a sectional view illustrating in detail a releasable latch pin for releasably connecting the wheel mounting to the rigid frame of the trailer.

It may be desirable in some instances to provide for the removal of the pin or bolt 133 holding the torque bars 30 secured to the frame members 23 by manipulation from the forward end of the trailer T. A construction for accomplishing such an operation is illustrated in Figures 7 and 8. Assuming the common head 131 (Figure 6) to be employed in the construction shown in Figures 7 and 8, the bolt 133 is replaced by a detachable connecting pin 233 (Figure 8) which extends through the head 131 substantially horizontally and which is mounted in a housing 50 which is welded or otherwise secured to one of the wheel frame members 23.

The pin 233 extends outwardly from the cylinder 50 and has a ring 233a at its outer end which is connected to a wire or line 51. The other end of the line or wire is connected to an operating handle 52 mounted on the trailer frame T in any suitable manner so that it can apply a force to the pin 233 to pull same from the head 131. The pin 233 is however normally retained in the opening 133a in the head 131 by a spring 56 which is disposed in the cylinder and which abuts a disc 57 secured to the pin 233 to urge the pin 233 inwardly. A stop surface 58 is provided on the frame member 23 to limit the inward movement caused by the urging of the spring 56. The spring action 56 can be overcome by pulling forwardly on the handle 52 at the forward end of the trailer T. The particular construction shown in Figures 7 and 8 permits the pin 233 to be retracted when it is desired to completely release the wheels 10 from the resisting force of the torque bars 30 so that the weight of the boat acts to force the wheels 10 to a substantially horizontal position. Such operation is often desirable in lowering the boat down at the beach for rolling the boat from the trailer into the water.

Figure 9:
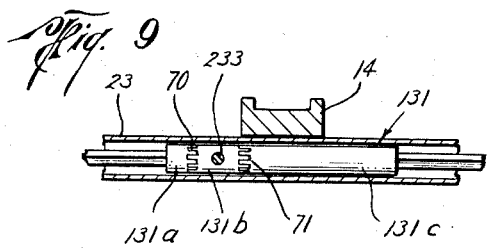
Figure 9 is a view similar to Figure 6, but illustrating a further modification thereof wherein the attachment of the wheel mounting to the frame of the trailer provides for a plurality of adjustments with respect to the cushioning effect of the wheel mounting.

In Figure 9, a modification is illustrated wherein the common head 131 is divided into three segments 131a, 131b and 131c. The pin 233 is utilized for holding the segment 131b against movement with respect to the frame member 23, although it will be understood that a bolt such as 133 could be utilized instead of the pin 233. The segment 131a is fitted to the segment 131b by a splined connection 70 which includes spline teeth and grooves of well known construction and the segment 131c is similarly connected to the segment 131b by a spline connection 71 which is also formed with the usual teeth and grooves which mate with each other. With such a construction, either segment 131a or 131c can be disengaged at the spline 70 or 71, respectively, and reengaged at a different position so as to change the angle at which the wheel 10 connected thereto is positioned with respect to the road or other surface upon which the wheel rests. Thus, various degrees of resiliency or cushioning can be obtained with this construction and each wheel 10 can be adjusted independently of the other wheel.

The foregoing disclosure and description of the invention is illustrative and explanatory thereof and various changes in the size, shape and material, as well as in the details of the illustrated construction may be made, within the scope of the appended claim, without departing from the spirit of the invention.

What is claimed is:

A mounting for a wheel on the frame of a trailer, comprising a tubular wheel supporting frame member, a torque bar disposed in said tubular frame member, means connecting the inner end of said bar to said frame member to prevent turning of said inner end of said bar relative to said frame member, a sleeve surrounding the outer end of said frame member and being adapted to turn relative thereto, means connecting the sleeve to the outer end of said bar, means connecting said wheel to said sleeve for transmitting vertical movements of said wheel to the outer end of said bar, said bar being formed of a material capable of resisting the upward vertical movements of said wheel and for returning said wheel to its normal running position, said sleeve having an arcuate notch in its inner end, a stop lug on the external surface of said tubular frame member positioned in the notch for contacting the end surfaces of the notch to limit the movement of the sleeve relative to the tubular frame member so that the twisting of the torque bar is also limited to prevent the twisting of such torque bar to such an extent that it is permanently deformed, said means which connects the inner end of said bar to said tubular frame member including, a cylindrical head on the end of said torque bar and rotatable relative to said tubular frame member, said head and said tubular frame member each having openings which are adapted to be aligned when the wheel is in a normal running position relative to the frame, a retaining member extending through the openings in the frame member and the head to hold the inner end of the torque bar fixed relative to the frame member, and means connected to said retaining member and operable from the front of said trailer for retracting said retaining member from said openings to permit the frame to drop relative to the wheel.

References Cited in the file of this patent

UNITED STATES PATENTS

| | | |
|---|---|---|
| 2,164,096 | Tjaarda | June 27, 1939 |
| 2,297,465 | Froehlich | Sept. 29, 1942 |
| 2,497,072 | Cooper | Feb. 14, 1950 |
| 2,587,624 | Johnson | Mar. 4, 1952 |

FOREIGN PATENTS

| | | |
|---|---|---|
| 802,681 | Germany | Feb. 19, 1951 |